(12) United States Patent
Medapalli et al.

(10) Patent No.: US 9,179,428 B2
(45) Date of Patent: Nov. 3, 2015

(54) COMMUNICATIONS DEVICE WITH DIRECT CELLULAR-TO-COLLOCATED DEVICE COMMUNICATION CHANNEL INTERFACE

(71) Applicant: Broadcom Corporation, Irvine, CA (US)

(72) Inventors: Kamesh Medapalli, San Jose, CA (US); Robert Lorenz, Menlo Park, CA (US); Charles Abraham, Los Gatos, CA (US); Brima Ibrahim, Laguna Hills, CA (US); Frank van Diggelen, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 223 days.

(21) Appl. No.: 13/927,977

(22) Filed: Jun. 26, 2013

(65) Prior Publication Data

US 2015/0005029 A1    Jan. 1, 2015

(51) Int. Cl.
| | |
|---|---|
| H04M 1/00 | (2006.01) |
| H04W 24/00 | (2009.01) |
| H04M 11/04 | (2006.01) |
| H04W 56/00 | (2009.01) |
| H04W 4/02 | (2009.01) |
| H04W 76/02 | (2009.01) |

(52) U.S. Cl.
CPC ............ *H04W 56/001* (2013.01); *H04W 4/021* (2013.01); *H04W 56/0035* (2013.01); *H04W 76/023* (2013.01)

(58) Field of Classification Search
CPC ..................... H04M 1/72519; H04M 1/72522; G01S 19/25; G01S 19/34

USPC .......... 455/456.1, 456.2, 456.5, 456.6, 404.2, 455/550.1

See application file for complete search history.

(56) References Cited

U.S. PATENT DOCUMENTS

| | | | |
|---|---|---|---|
| 8,185,083 B2* | 5/2012 | Babitch et al. ............. | 455/343.1 |
| 2006/0217131 A1* | 9/2006 | Alizadeh-Shabdiz et al. .......................... | 455/456.1 |
| 2009/0224975 A1* | 9/2009 | Xhafa et al. .............. | 342/357.12 |
| 2010/0171659 A1* | 7/2010 | Waters et al. ............. | 342/357.12 |
| 2010/0330931 A1* | 12/2010 | Uehara et al. ................... | 455/75 |
| 2011/0018761 A1* | 1/2011 | Walley et al. ............. | 342/357.28 |
| 2011/0076972 A1* | 3/2011 | Cooley ........................ | 455/154.1 |
| 2011/0287779 A1* | 11/2011 | Harper ........................ | 455/456.1 |
| 2013/0170531 A1* | 7/2013 | Adut et al. .................... | 375/226 |

* cited by examiner

*Primary Examiner* — Dung Hong
(74) *Attorney, Agent, or Firm* — Sterne, Kessler, Goldstein & Fox P.L.L.C.

(57) ABSTRACT

A communications device having a communication channel interface between a cellular communications module and a Global Navigation system (GNSS) module is provided. The communication channel interface can be used to forward one or more of: a frequency offset correction message, a fine time assistance (FTA) message, and an assisted-GNSS (A-GNSS) message from the cellular communications module to the GNSS module; to forward timing and frequency information from the GNSS module to the cellular communications module to enable a delayed sleep mode wake up of the cellular communications module; to enable hybrid data fusion between the cellular communications module and the GNSS module; and/or to offload processes from the GNSS module to the cellular communications module.

19 Claims, 6 Drawing Sheets

COMMUNICATIONS DEVICE WITH DIRECT CELLULAR-TO-COLLOCATED DEVICE COMMUNICATION CHANNEL INTERFACE

FIELD OF THE INVENTION

The present disclosure relates generally to a communications device with a direct cellular-to-collocated device communication channel interface.

BACKGROUND

Background Art

Cellular-based and Global Navigation Satellite System (GNSS)-based applications are widespread in today's personal communication devices. Cellular-based applications rely on having a cellular communications modem within the communications device and the availability of a cellular network. GNSS-based applications rely on the availability of a GNSS receiver within the communications device.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

In the following disclosure, terms defined by the Long-Term Evolution (LTE) standard are sometimes used. For example, the term "eNodeB" is used to refer to what is commonly described as a base station (BS) or a base transceiver station (BTS) in other standards. The term "User Equipment (UE)" is used to refer to what is commonly described as a mobile station (MS) or mobile terminal in other standards. However, as will be apparent to a person of skill in the art based on the teachings herein, embodiments are not limited to the LTE standard and can be applied to other cellular communication standards (e.g., Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), Worldwide Interoperability for Microwave Access (WiMAX), etc.). Further, embodiments are not limited to cellular communication networks and can be used or implemented in other kinds of wireless communication access networks (e.g., wireless local area network (WLAN), Bluetooth (BT), etc.).

Figure 1:
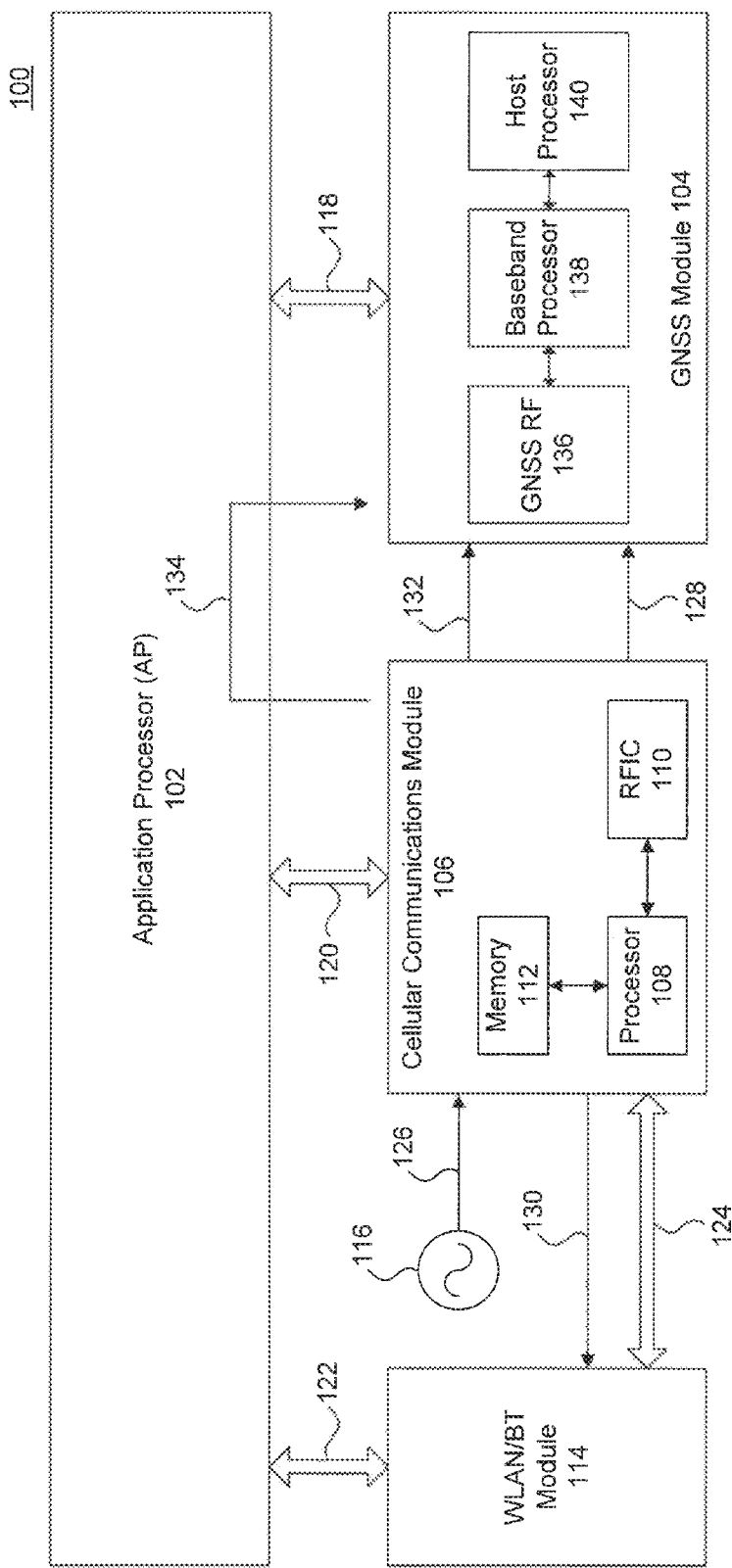
FIG. 1 illustrates an example communications device according to an embodiment.

FIG. 1 illustrates an example communications device 100 according to an embodiment. Example communications device 100 is provided for the purpose of illustration and is not limiting of embodiments of the present disclosure. Communications device 100 may be a smart phone, tablet, or personal computer (PC), for example, which enables data communication (e.g., Internet access, email, smart phone applications, etc.) as well as voice calling. Communications device 100 may support various cellular communication technologies including, without limitation, LTE, HSPA+, W-CDMA, CDMA2000, TD-SCDMA, GSM, GPRS, EDGE, and WiMAX, for example.

As shown in FIG. 1, communications device 100 includes an application processor (AP) 102, a Global Navigation Satellite System (GNSS) module 104, a cellular communications module 106, a WLAN/BT module 114, and a temperature compensated crystal oscillator 116.

AP 102 can enable various Internet Protocol (IP)-based applications, including data, audio (e.g., voice, streaming music, etc.), and/or video applications. To support these applications, AP 102 can implement various protocol stacks, including an "IP" stack, which includes the Transmission Control Protocol (TCP) and/or the User Datagram Protocol (UDP) over the Internet Protocol (IP). Further, AP 102 can enable various navigation applications and/or location-based services (LBS) applications. These navigation and/or location-based services (LBS) applications can be enabled by GNSS, cellular communication, and/or WLAN technologies, for example.

AP 102 can communicate with other modules of communications device 100. For example, as shown in FIG. 1, AP 102 can communicate with GNSS module 104 via an interface 118, with cellular communications module 106 via an interface 120, and with WLAN/BT module 114 via an interface 122. Interfaces 118, 120, and 122 can each be implemented as a Secure Digital Input/Output (SDIO) interface, a High-Speed-Inter-Chip (HSIC) interface, or a Universal Asynchronous Receiver/Transmitter (UART) interface, for example. In an embodiment, interface 118 includes a UART interface, interface 120 includes a HSIC interface, and interface 122 includes a SDIO interface. In an embodiment, AP 102 includes respective interface drivers (not shown in FIG. 1) to drive interfaces 118, 120, and 122.

In an embodiment, AP 102 can use each of cellular communications module 106 and WLAN/BT module 114 as a data link layer or Layer 2 (L2) pipe that provides L2 functions for IP-based traffic sent and received by AP 102. For example, L2 functions provided by cellular communications module 106 or WLAN/BT module 114 may include, without limitation, data link layer functions, Medium Access Control (MAC) layer functions, and Radio Link Control (RLC) functions. In addition, AP 102 can use each of cellular communications module 106 and WLAN/BT module 114 for baseband processing, functions, including, without limitation, channel encoding/decoding, line coding/decoding, modulation/demodulation, etc. In an embodiment, the functions provided by cellular communications module 106 are particular to cellular communication technologies supported by cellular communications module 106. Functions provided by WLAN/BT module 114 are particular to WLAN technologies and/or Bluetooth technologies supported by WLAN/BT module 114.

Cellular communications module 106 includes one or more cellular communications modems, which can support a variety of cellular communications technologies, including, without limitation, LTE, HSPA+, W-CDMA, CDMA2000, TD-SCDMA, GSM, GPRS, EDGE, and WiMAX, for example. As shown in FIG. 1, cellular communications module 106 includes, without limitation, a processor 108, a radio frequency integrated circuit (RFIC) module 110, and a memory 112. Cellular communications module 106 enables communications device 100 to communicate with a cellular network, and more particularly with a base station of the cellular network. Cellular communications module 106 is coupled to WLAN/BT module via an interface 124. In an embodiment interface 124 includes a Global Coexistence Interface (GCI).

Processor 108 can include one or more processors or processing engines (e.g., Digital Signal Processing (DSP) engines), including, for example, a general controller processor/processing engine, a L2 protocol stack processor/processing engine, a baseband processor/processing engine, and a speech coding processor/processing engine. Processor 108 uses memory 112 to support its processing functions.

The general controller processor includes a chip-level general controller of cellular communications module 106, which can perform general housekeeping functions, including boot up, configuration, and management functions within cellular communications module 106. The speech coding processor/processing engine implements various speech coding, including, for example, narrow-band, wide-band, and adaptive multi-rate speech coding functions, data compression functions, and/or acoustical processing functions, including noise suppression, echo cancellation, etc.

The L2 protocol stack processor/processing engine implements one or more L2 protocol stacks, including, for example, data link layer protocols, MAC layer protocols, and RLC protocols. L2 protocols are defined by cellular communications technologies and may be common to more than one technology. In an embodiment, as described above, the L2 protocol stack processor/processing engine provides an L2 data pipe for AP 102 via interface 120.

The baseband processor/processing engine implements baseband processing functions, including, without limitation, channel encoding/decoding, line coding/decoding, modulation/demodulation, etc. For example, the baseband processor/processing engine may implement a variety of baseband processing functions in accordance with various cellular communications standards, including, for example and without limitation, LTE, HSPA+, W-CDMA, CDMA2000, TD-SCDMA, GSM, GPRS, and WiMAX.

In an embodiment, the baseband processor/processing engine communicates with RFIC module 110 to transmit or receive signals over the air interface. RFIC module 110 includes various mixed signal (e.g., Digital-to-Analog Converters (DACs), Analog-to-Digital Converters (ADCs)) and analog components (filters, mixers, power amplifier (PA), low noise amplifier (LNA), etc.) that provide at least one RF transmit chain and at least one RF receive chain.

GNSS module 104 includes one or more GNSS receivers, including, for example, a Global Position System (GPS) receiver, a GLONASS receiver, a Galileo receiver, and/or a Beidou receiver. As shown in FIG. 1, in an embodiment, a GNSS receiver can include a GNSS radio frequency (RF) unit 136 for receiving satellite signals; a baseband processor 138 for sampling the received satellite signals and using the samples to search for, acquire, and track satellites; and a host processor 140 for providing higher-level navigation solutions (e.g., position/velocity calculation). In other embodiments, host processor 140 is part of AP 102 instead of the GNSS receiver. As would be understood by a person of skill in the art, the GNSS receiver can be implemented using a different architecture than shown in FIG. 1, in other embodiments.

WLAN/BT module 114 implements a WLAN protocol stack and/or a Bluetooth protocol stack, which perform physical layer (Layer 1 (L1)) and L2 WLAN and BT functions respectively. As described above, WLAN/BT module 114 is coupled to cellular communications module 106 via interface 124. In an embodiment, interface 124 includes a GCI used to exchange information between WLAN/BT module 114 and cellular communications module 106 to ensure coexistence of the communication technologies being used by WLAN/BT module 114 and cellular communications module 106. For example, interface 124 can be used to exchange information for the coexistence of LTE communications enabled by cellular communications module 106 and WLAN/BT communications enabled WLAN/BT module 114.

In an embodiment, cellular communications module 106 is configured to receive a temperature compensated clock signal 126 from temperature compensated oscillator 116. For example, clock signal 126 can be received by RFIC module 110 of cellular communications module 106. In addition to using clock signal 126 to perform its RF functions, cellular communications module 106 forwards clock signal 126 as a clock signal 128 to GNSS module 104 and as a clock signal 130 to WLAN/BT module 114.

In an embodiment, clock signals 128 and 130 are free running signals (not frequency locked to a reference signal) and thus may drift in frequency as they propagate to GNSS module 104 and WLAN/BT module 114 respectively. To compensate for any potential frequency drill in clock signals 128 and 130, in an embodiment, cellular communications module 106 is configured to provide frequency corrections periodically (e.g., at a 5 Hz rate) to GNSS module 104 and/or to WLAN/BT module 114. GNSS module 104 and/or WLAN/BT module 114 can apply the frequency corrections to clock signals 128 and 130 respectively to compensate for any frequency drift.

In an embodiment, to generate the frequency corrections, cellular communications module 106 is configured to generate a frequency offset of crystal oscillator 116 by comparing a phase of clock signal 126 with a phase estimate derived from pilot signals received from the cellular network. The frequency offset is used within cellular communications module 106 to correct clock signal 126 as necessary before generating local oscillator (LO) signals for use by RFIC module 110. Additionally, the frequency offset is used to generate the frequency corrections provided to GNSS module 104 and/or WLAN/BT module 114.

In an embodiment, as shown in FIG. 1, cellular communications module 106 provides the frequency corrections to GNSS module 104 via a data path 134 that traverses AP 102.

Additionally, cellular communications module 106 may forward assisted-GNSS (A-GNSS) data and/or fine time assistance (FTA) data received from the cellular network to GNSS module 104 via data path 134. Cellular communications module 106 also provides a FTA pulse 132 to GNSS module 104, which is used together with the FTA assistance data to achieve accurate timing by GNSS module 104.

In an embodiment, traversing data path 134 includes traversing interface 120 from cellular communications module 106 to AP 102, internally traversing AP 102 from an input port of interface 102 to an output port of interface 118, and then traversing interface 118 from AP 102 to GNSS module 104. Accordingly, data provided from cellular communications module 106 to GNSS module 104 via data path 134 can incur relatively high latency depending on the utilization of interfaces 120 and 118 and the processing load of AP 102. This can degrade the quality of the frequency corrections. A-GNSS data, and FTA data provided to the GNSS module 104 for their respective purposes. Additionally, the communication between cellular communications module 106 and GNSS module 104 via data path 134 requires that AP 102 remains at least partially on and can preclude AP 102 from entering low power/sleep mode when possible.

Figure 2:
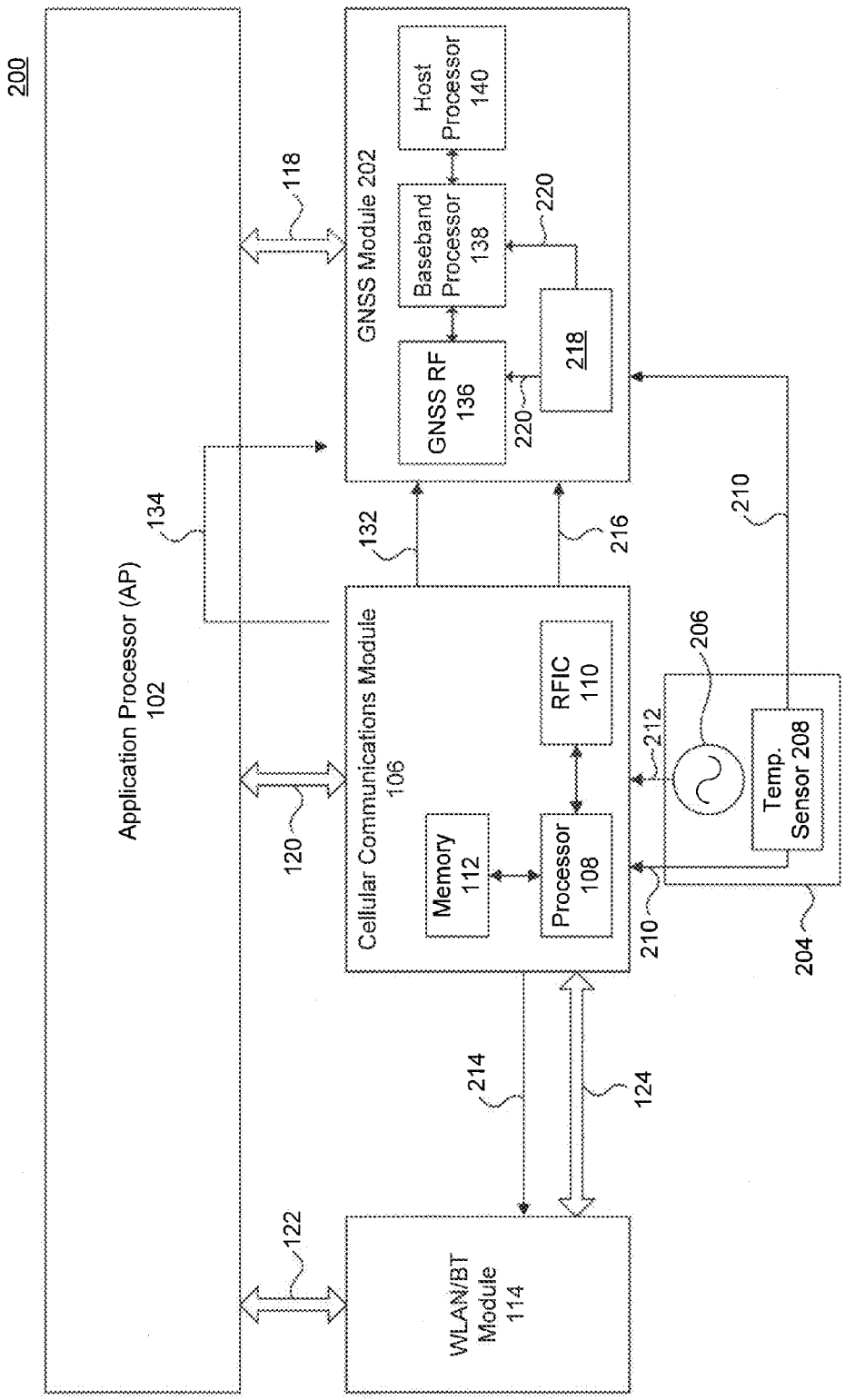
FIG. 2 illustrates another example communications device according to an embodiment.

FIG. 2 illustrates an example communications device 200 according to an embodiment. Example communications device 200 is provided for the purpose of illustration and is not limiting of embodiments of the present disclosure. Communications device 200 may be a smart phone, tablet, or personal computer (PC), for example, which enables data communication (e.g., Internet access, email, smart phone applications, etc.) as well as voice calling. Communications device 200 may support various cellular communication technologies including, without limitation, LTE, HSPA+, W-CDMA, CDMA2000, TD-SCDMA, GSM, GPRS, EDGE, and WiMAX, for example.

As shown in FIG. 2, communications device 200 includes an application processor (AP) 102, a cellular communications module 106, and a WLAN/BT module 114 similar to example communications device 100 described with respect to FIG. 1 above. In addition, communications device 200 includes a GNSS module 202 and a clock oscillator module 204. GNSS module 202 includes a GNSS RE unit 136, a baseband processor 138, and a host processor 140 similar to GNSS module 104 described with respect to FIG. 1 above. Additionally, GNSS module includes a clock circuit 218.

Clock oscillator module 204 includes a crystal oscillator circuit 206 configured to generate a clock signal 212, and a temperature sensor 208 configured to generate a temperature sensor signal 210 indicative of temperature in proximity of crystal oscillator circuit 206. Clock signal 212 is not temperature compensated. In an embodiment, clock oscillator module 204 provides clock signal 212 and temperature sensor signal 210 to cellular communications module 106. Cellular communications module 106 corrects clock signal 212 as necessary using temperature sensor signal 210. In an embodiment, cellular communications module 106 uses a lookup table (not shown in FIG. 2) to retrieve a frequency correction for clock signal 212 based on temperature sensor signal 210 and applies the correction to clock signal 212 to generate a temperature compensated clock signal. Cellular communications module 106 then uses the temperature compensated clock signal in its RFIC module 110, for example. Additionally, in an embodiment, cellular communications module 106 forwards the temperature compensated clock signal as clock signals 216 and 214 to GNSS module 202 and WLAN/BT module 114, respectively.

In another embodiment, cellular communications module 106 forwards clock signal 212 as clock signal 216 to GNSS module 202, which also receives temperature sensor signal 210 from clock oscillator module 204. Clock circuit 218 of GNSS module 202 corrects clock signal 216 as necessary using temperature sensor signal 210 to generate a temperature compensated clock signal 220. In an embodiment, clock circuit 218 includes an analog-to-digital converter (ADC) that converts temperature sensor signal 210 from analog to digital before using it to correct clock signal 216. Clock circuit 218 provides clock signal 220 to GNSS RF unit 136 and baseband processor 138.

As in example communications device 100 described with respect to FIG. 1 above, cellular communications module 106 can provide frequency corrections for clock signal 216, A-GNSS assistance data, and FTA data to GNSS module 202 via data path 134. However, as described above, the use of data path 134 to transport data between cellular communications module 106 and GNSS module 202 can have some drawbacks, including latency and increased power consumption. These drawbacks are addressed by example communications device 300 described below.

Figure 3:
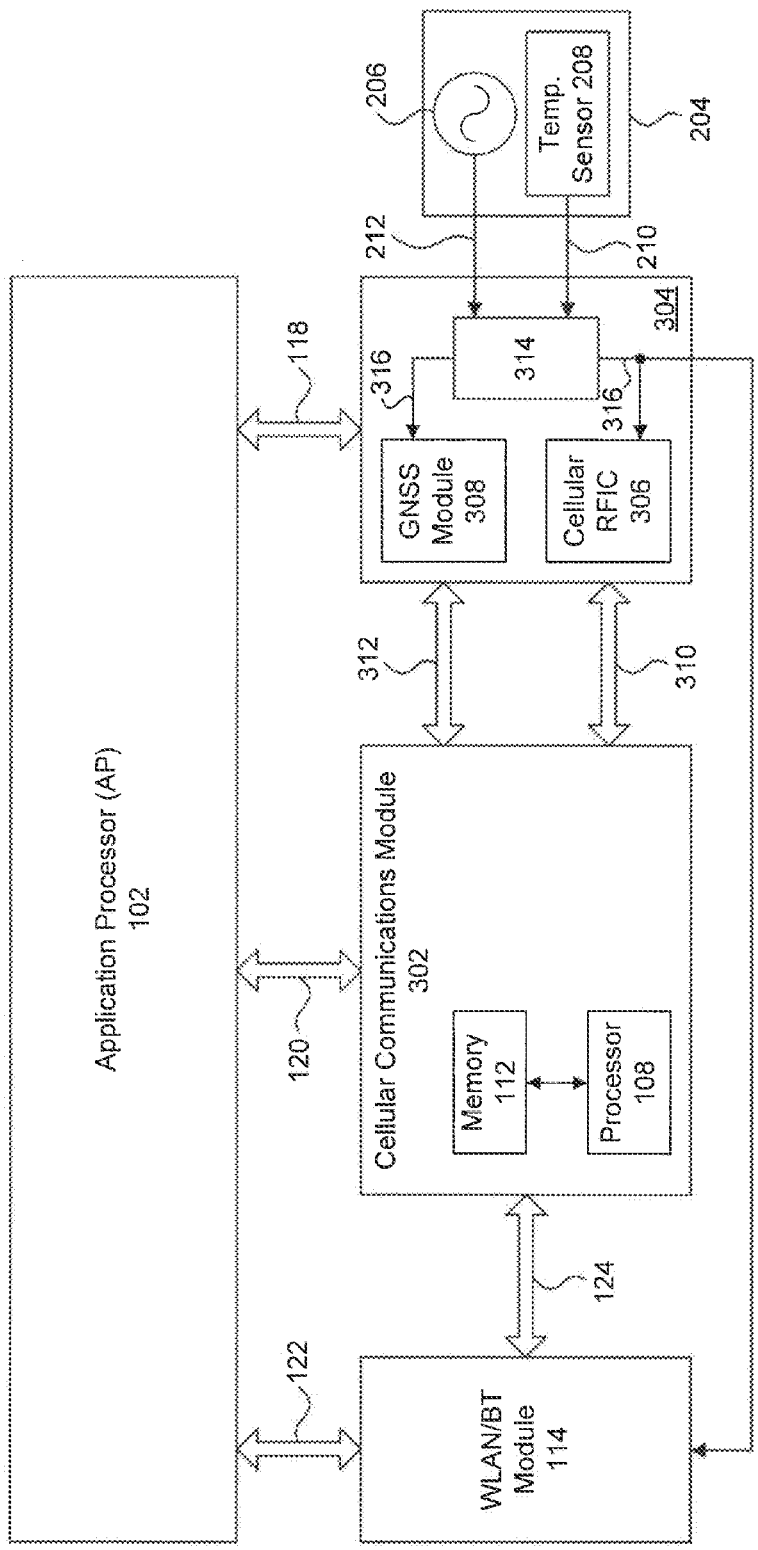
FIG. 3 illustrates another example communications device according to an embodiment.

FIG. 3 illustrates an example communications device 300 according to an embodiment. Example communications device 300 is provided for the purpose of illustration and is not limiting of embodiments of the present disclosure. Communications device 300 may be a smart phone, tablet, or personal computer (PC), for example, which enables data communication (e.g., Internet access, email, smart phone applications, etc.) as well as voice calling. Communications device 300 may support various cellular communication technologies including, without limitation, LTE, HSPA+, W-CDMA, CDMA2000, TD-SCDMA, GSM, GPRS, EDGE, and WiMAX, for example.

As shown in HG. 3, communications device 300 includes an application processor (AP) 102, a WLAN/BT module 114, and a clock oscillator module 204 similar to example communications device 200 described with respect to FIG. 2 above. In addition, communications device 300 includes a cellular communications module 302 and a multi-chip module (MCM) 304. Cellular communications module 302 includes a processor 108 and a memory 112 similar to cellular communications module 106 described with respect to FIGS. 1 and 2 above.

MCM 304 integrates a cellular RFIC module 306, a GNSS module 308, and dock circuitry 314. In another embodiment, cellular RFIC module 306, GNSS module 308, and dock circuitry 314 are monolithically integrated in a single chip. Cellular RFIC module 306 can be similar to RFIC module 110 described with respect to FIG. 1 above, and may include various mixed signal (e.g., DACs, ADCs, etc.) and analog components (filters, mixers, PAs, LNA, etc.) that provide at least one RF transmit chain and at least one RF receive chain. GNSS module 308 can be similar to GNSS modules 104 and 202 described with respect to FIGS. 1 and 2 above, and can include one or more GNSS receivers, including GPS, GLONASS, Galileo, and/or Beidou receiver. GNSS receivers of GNSS module 308 can include a GNSS RF module (such as GNSS RF module 136), a baseband processor (such as baseband processor 138), and a host processor (suck as host processor 140). Clock circuitry 314 can be similar to clock circuit 218 of GNSS module 202.

In an embodiment, clock circuitry 314 is configured to receive clock signal 212 and temperature sensor signal 210 from clock oscillator module 204 and to correct clock signal 212 as necessary using temperature sensor, signal 210 to generate a temperature compensated signal 316. Clock circuitry 314 provides clock signal 316 to GNSS module 308, cellular RFIC module 306, and optionally to WLAN/BT module 114. By integrating GLASS module 308 and cellular RFIC module 306 in a single MCM module as shown in FIG. 3, a single clock circuitry, such as clock circuitry 314, can be used for generating temperature compensated dock signals for all modules and clock signals (temperature compensated or otherwise) no longer need to be forwarded between cellular communications module 302 and MCM 304. Further, frequency corrections to clock signal 316 need to be performed only once within MCM 304 (compared to applying the frequency corrections inside cellular communications module 106 and then inside GNSS module 104 in FIG. 1, for example). This improves timing/frequency precision at GNSS module 308 compared to GNSS modules 104 and 202, for example.

Cellular RFIC module 306 is coupled via an analog interface 310 (e.g., analog I/Q (in-phase/quadrature)) to cellular communications module 302. In an embodiment, analog interface 310 is used to forward analog I/Q data between cellular RFIC module 306 and cellular communications module 302. GNSS module 308 is coupled via a communication channel interface 312 (directly) to cellular communications module 302. In an embodiment, communication channel interface 312 includes a 2-wire Universal Asynchronous Receiver/Transmitter (UART) interface, but others types of communications interface may also be used. In another embodiment, communication channel interface 312 extends as a shared communication channel between cellular communications module 302, GNSS module 308, and WLAN/BT module 114.

Communication channel interface 312 supports direct data communication between GNSS module 308 and cellular communications module 302. For example, cellular communications module 302 can use communication channel interface 312 (instead of data path 134 shown in FIGS. 1 and 2) to forward one or more of a frequency offset correction message (including cellular-assisted frequency corrections to clock signal 212), a fine time assistance (FTA) message, and an A-GNSS message to GNSS module 308. As, such, communication between cellular communications module 302 and GNSS module 308 can bypass. AP 102, resulting in significant power savings (by allowing AP 102 to remain in sleep mode longer) and reduced communication latency between cellular communications module 302 and GNSS module 308. The reduced communication latency in turn results in faster time/frequency calibration, reduced time, to first fix (TTFF), and improved tracking performance at GNSS module 308. In addition, communication channel interface 312 can enable a variety of features as described below for example.

In an embodiment, cellular communications module 302 can use communication channel interface 312 to forward a coexistence control message to GNSS module 308. The coexistence control message can indicate for example periods of time within which cellular transmission by cellular communications module 302 is likely to interfere with GNSS signal reception by GNSS module 308. In an embodiment, cellular communications module 302 generates the coexistence control message using RF interference tables pre-stored within cellular communications module 302, which indicate cellular transmission power levels likely to affect GNSS signal reception by GNSS module 308. In an embodiment, GNSS module 308 can process samples of received satellite signals in accordance with the coexistence control message. For example, GNSS module 308 can de-weight samples received within periods of time indicated by the coexistence control message (to avoid relying on erroneous samples) or increase a sample rate to improve the signal-to-noise ratio (SNR) during the indicated periods of time.

In another embodiment, communication channel interface 312 can be used to improve network search following idle/sleep mode and to reduce power consumption of cellular communications module 302. Specifically, in an embodiment, communication channel interface 312 can be used to pass highly precise timing and frequency information from GNSS module 308 to cellular communications module 302 before cellular communications module 302 exits from an idle/sleep mode cycle (in the idle/sleep mode cycle, some components of cellular communications module 302 are off/asleep but other components are on so that cellular communications module 302 can perform this embodiment). The timing and frequency information can be synchronized to GNSS time/frequency by GNSS module 308, for example. This enables cellular communications module 302 to exit the idle/sleep mode cycle with highly precise timing and frequency information available, which allows for the idle/sleep mode cycle exit to occur at a later time than normal. Specifically, with precise timing, and frequency information, cellular communications module 302 needs much less time to time/frequency synchronize to the cellular network (which is necessary before it may begin communicating with the cellular network) and thus can wake up at a later time than normal.

Similar usage of communication channel interface 312 between cellular communications module 302 and WLAN/BT module 114 and/or between GNSS module 308 and WLAN/BT module 114 is also possible according to embodiments.

Figure 4:
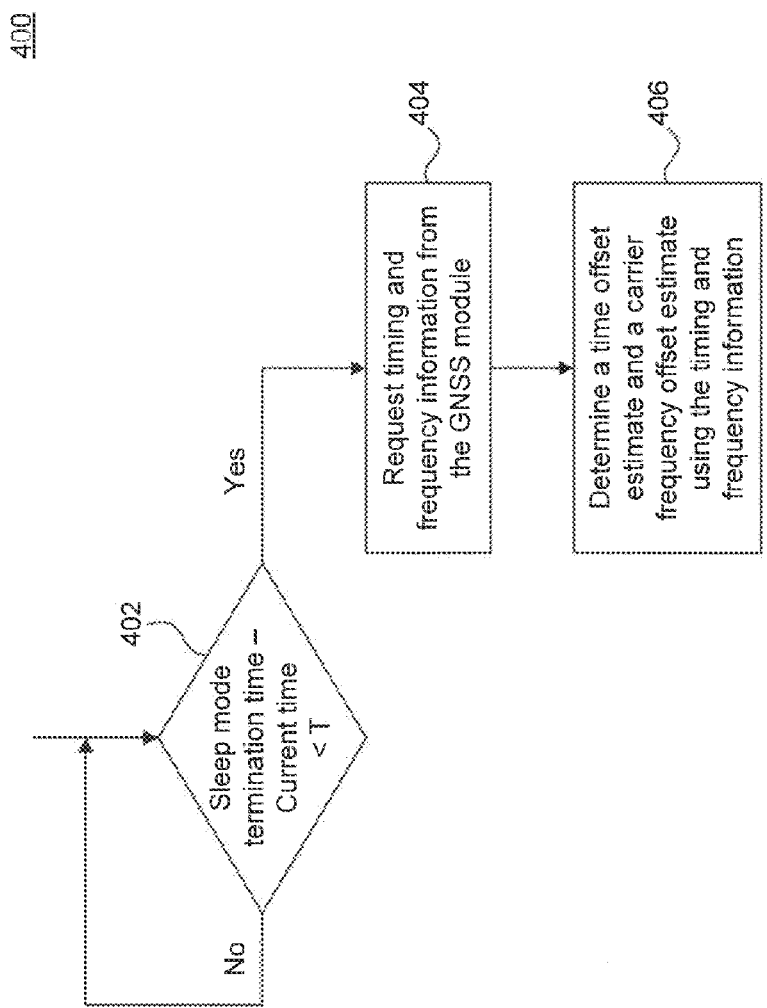
FIG. 4 illustrates an example process according to an embodiment.

FIG. 4 illustrates an example process 400 according to an embodiment. Example process 400 is provided for the purpose of illustration only and is not limiting of embodiment. Example process 400 can be performed by communications device 300 and more specifically by cellular communications module 302, but is not limited to performance by these modules.

As shown in FIG. 4, process 400 begins in step 402, which includes determining whether or not a scheduled sleep mode termination time is within a predetermined time (T) from the current time. If not, process 400 returns to step 402. Otherwise, process 400 proceeds to step 404, which includes requesting timing and frequency information from GNSS module 308. In an embodiment, step 404 includes sending a request for timing and frequency information from cellular communications module 302 to GNSS module 308 via communication channel interface 312. In response to the request, GNSS module 308 forwards the timing and frequency information to cellular communications module 302 via communication channel interface 312. In an embodiment, the timing and frequency information are synchronized to GNSS time/frequency by a highly precise time/frequency calibration loop within GNSS module 308.

Subsequently, process 400 proceeds to step 406, which includes determining a time offset estimate and a carrier frequency offset estimate using the timing and frequency information. The time offset estimate and the carrier frequency offset estimate are estimates of offsets between local time and frequency at cellular communications module 302 and the cellular network time and frequency respectively. By using the timing and frequency information from GNSS module 308, cellular communications module 302 can limit the search ranges (to within the accuracy of the timing and frequency information) for determining the time offset estimate and the carrier frequency offset estimate and establish time/ frequency synchronization with the network in a shorter time. As such, cellular communications module 302 can afford to exit the idle/sleep mode cycle at a later time than normal.

In another embodiment, communication channel interface 312 can be used to enable GNSS module 308 to borrow resources from cellular communications module 302 and/or to offload one or more GNSS processes to cellular communications module 302. For example, in an embodiment, GNSS module 308 can use processor 108 and/or memory 112 (and/or other available processing/memory resources) of cellular communications module 302, via communication channel interface 312, to perform certain GNSS processes/functions (e.g., location determination, tracking, Location Based Services (LBS) computations, etc.). In another embodiment, communication channel interface 312 can extend to WLAN/BT module 114 (e.g., to form a communication bus between GNSS module 308, cellular communications module 302, and WLAN/BT module 114), and GNSS module 308 can borrow resources and/or offload GNSS processes to WLAN/BT module 114 as described herein.

Figure 5:
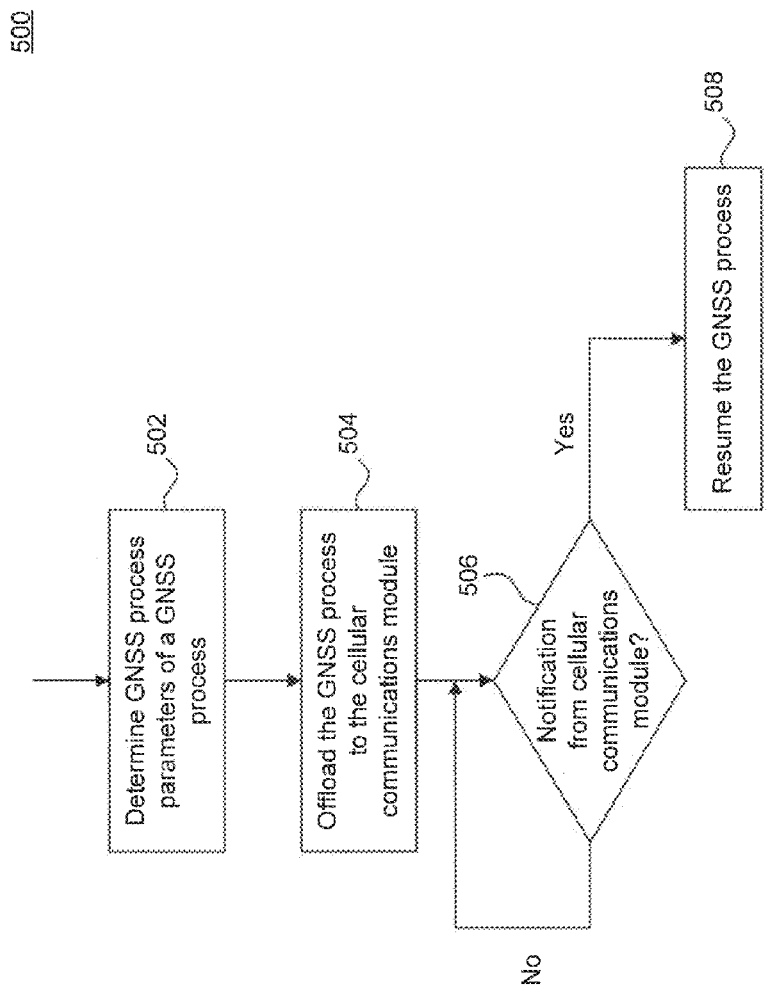
FIG. 5 illustrates an example process according to an embodiment.

In another embodiment, GNSS module 308 can offload a GNSS process to cellular communications module 302, where the GNSS process is performed without GNSS module 308 being involved until certain conditions are satisfied, at which time GNSS module 308 can resume the GNSS process. FIG. 5 illustrates an example process 500 for offloading a GNSS process from a GNSS module to a cellular communications module according to an embodiment. Example process 500 is provided for the purpose of illustration only and is not limiting of embodiments. Example process 500 can be performed by GNSS module 308 to offload a GNSS process to cellular communications module 302, but is not limited to performance by these modules.

As shown in FIG. 5, process 500 begins in step 502, which includes determining GNSS process parameters of a GNSS process. In an embodiment, step 502 includes determining any inputs/outputs of the GNSS process. The GNSS process parameters can include parameters passed to GNSS module 308 from AP 102. For example, the GNSS process parameters can include application defined parameters, including parameters generated by LBS applications. For example, the GNSS process may be for a Geofencing application (application that alarms the user when the communications device enters and/or exits a specified geographic area and/or is within a specified distance from selected locations). The GNSS process parameters may thus include the specified geographic area and/or the specified distance and the selected locations.

Then, in step 504, process 500 includes offloading the GNSS process to cellular communications module 302. This includes passing some or all, of the GNSS process parameters determined in step 502 to an equivalent cellular-enabled process of cellular communications module 302, via communication channel interface 312. In an embodiment, the cellular-enabled process performs the same or a similar functionality as the GNSS process using cellular-enabled means. For example, the cellular-enabled process can use LIE positioning methods, such as Cell ID (CID) (which relies on the knowledge of the location of the serving cell of a user), Enhanced CID (E-CID) (relies on CID and RF signal strength and angle-of-arrival (AOA) measurements from multiple cells), and/or Observed Time Difference of Arrival (OTDOA) (relies on reference signal time difference, (RSTD) measurements performed on downlink positioning reference signals (PRS)). In an embodiment, while the GNSS process is offloaded to cellular communications module 302, GNSS module 308 can stop tracking satellites unless required for another GNSS process.

Subsequently, process 500 proceeds to step 506, which includes determining whether a notification message has been received from cellular communications module 302. In an embodiment, cellular communications module 302 generates and sends a notification message to GNSS module 308 when conditions associated with the GNSS process are satisfied. In an embodiment, the notification message is sent via communication channel interface 312. For example, in an embodiment, the GNSS process includes a Geofencing function, and cellular communications module 302 generates and sends the notification message to GNSS module 308 when location conditions associated with the Geofencing function are satisfied (e.g., the cellular-enabled process determines that the communications device has entered and/or exited the specified geographic area and/or is within the specified distance from the selected locations, determined by the Geofencing function).

If no notification message has been received in step 506, process 500 returns to step 506. Otherwise, if a notification message has been received in step 506 from cellular communications module 302, process 500 proceeds to step 508, which includes resuming the GNSS process over GNSS module 308. For example, if the GNSS process includes a Geofencing function, resuming the GNSS process can include fine tuning the location estimate of the device to determine whether or not the Geofencing conditions are definitely satisfied. If yes, GNSS module 308 can signal the Geofencing application running on AP 102 to generate a user alarm.

In another embodiment, communication channel interface 312 can be used to enable hybrid data fusion bet cellular communications module 302 and GNSS module 308. Hybrid data fusion can include the combination of any kind of information that is available equivalently at cellular communications module 302 and GNSS module 308. For example, hybrid data fusion can include the combination of position estimates generated by cellular communication module 302 and GNSS module 308 to generate an improved accuracy position estimate of communications device 300.

Figure 6:
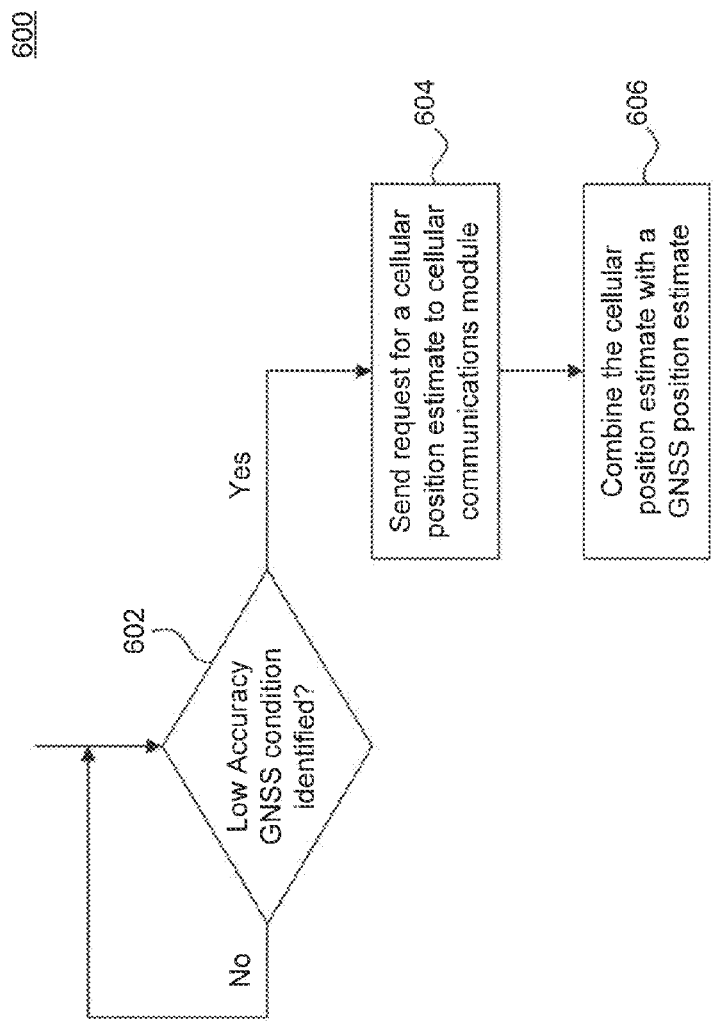
FIG. 6 illustrates an example process according to an embodiment.

According to embodiments, hybrid data fusion of position estimates can be performed at cellular communications module 302. GNSS module 308, and/or AP 102. FIG. 6 illustrates an example process 600 for enabling hybrid data fusion of position estimates according to an embodiment. Example process 600 can be performed by GNSS module 308. Example process 600 is provided for the purpose of illustration only and is not limiting. As would be understood by a person of skill in the art, in other embodiments, example process 600 can be performed at cellular communications module 302, but is not limited to performance by this module.

As shown in FIG. 6, process 600 begins in step 602, which includes determining whether a low accuracy GNSS condition has been identified. In an embodiment, a low accuracy GNSS condition corresponds to a condition for which a GNSS position estimate is below a specified accuracy level. The specified accuracy level can be defined by a LBS application running on AP 102, for example, or set within GNSS module 308. If the answer in step 602 is no, process 600 returns to step 602. Otherwise, process 600 proceeds to step 604.

In step 604, process 600 includes sending a request for a cellular position estimate to cellular communications module 302. In an embodiment, the request is sent via communication channel interface 312. In response to the request, cellular communications module 302 generates and forwards a cellular position estimate of communications device 300 to GNSS module 308 via communication channel interface 312. In an embodiment, cellular communications module 302 generates the cellular position estimate using cellular-enabled position means, such as LTE CID, E-CID, and/or OTDOA.

Process 600 terminates in step 606, which includes combining the cellular positioning estimate with a GNSS position estimate generated by GNSS module 308, to generate a combined position estimate of communications device 300. In an embodiment, the combined position estimate can have higher accuracy than the GNSS position estimate.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A communications device, comprising:
a crystal oscillator module configured to generate a clock signal and a temperature sensor signal indicative of temperature in proximity of the crystal oscillator module; and
a multi-chip module (MCM) comprising:
a cellular radio frequency (RF) integrated circuit (RFIC) module;
a Global Navigation Satellite System (GNSS) module; and
clock circuitry configured to:
receive the clock signal and the temperature sensor signal from the crystal oscillator module,
utilize the temperature sensor signal as an index for a lookup table to retrieve a frequency correction,
apply the frequency correction to the clock signal to generate a temperature compensated clock signal, and
provide the temperature compensated clock signal to the cellular RFIC module and the GNSS module.

2. The communications device of claim 1, further comprising:
a cellular communications processor configured to implement communication protocols for one or more of: Long Term Evolution (LTE), Evolved High-Speed Packet Access (HSPA+), Time Division-Synchronous Code Division Multiple Access (TD-SCDMA), and Enhanced Data Rates for GSM Evolution (EDGE).

3. The communications device of claim 1, wherein the crystal oscillator module comprises:
a crystal oscillator circuit configured to generate the clock signal; and
a temperature sensor configured to generate the temperature sensor signal.

4. The communications device of claim 1, further comprising:
a combined wireless local area network (WLAN)/Bluetooth (BT) module,
wherein the clock circuitry is further configured to provide the temperature compensated clock signal to the combined WLAN/BT module.

5. The communications device of claim 1, further comprising:
a cellular communications module; and
a communication channel interface to directly couple the cellular communications module and the GNSS module.

6. The communications device of claim 1, further comprising:
a cellular communications module; and
a communication channel interface that couples the cellular communications module and the GNSS module,
wherein the communication channel interface includes a 2-wire Universal Asynchronous Receiver/Transmitter (UART) interface.

7. A communications device, comprising:
a cellular communications module including a memory and a processor;
a Global Navigation Satellite System (GNSS) module;
a cellular radio frequency (RF) integrated circuit (RFIC) module coupled to the cellular communication module and the GNSS module; and
a communication channel interface that couples the cellular communications module and the GNSS module,
wherein the cellular RFIC module and the GNSS module are monolithically integrated in a single chip, the single chip comprising:
clock circuitry configured to:
receive a clock signal and a temperature sensor signal from a crystal oscillator module,
utilize the temperature sensor signal as an index for a lookup table to retrieve a frequency correction,
apply the frequency correction to the clock signal to generate a temperature compensated clock signal, and
provide the temperature compensated clock signal to the cellular RFIC module and the GNSS module.

8. The communications device of claim 7, wherein the GNSS module is configured to forward timing and frequency information to the cellular communications module.

9. The communications device of claim 8, wherein the cellular communications module is further configured to request the timing and frequency information from the GNSS module before terminating a sleep mode cycle.

10. The communications device of claim 7, wherein the cellular communications module is further configured to forward a cellular position estimate of the communications device to the GNSS module.

11. The communications device of claim 10, wherein the GNSS module is configured to combine the cellular position estimate with a GNSS position estimate generated by the GNSS module to generate a position estimate of the communications device.

12. The communications device of claim 7, wherein the cellular communications module is further configured to forward a coexistence control message to the GNSS module.

13. The communications device of claim 12, wherein the GNSS module is configured to process samples of received satellite signals in accordance with the coexistence control message.

14. The communications device of claim 7, wherein the GNSS module is configured to borrow a resource of the cellular communications module to perform a GNSS function.

15. The communications device of claim 7, wherein the GNSS module is configured to offload a GNSS process to the cellular communications module.

16. The communications device of claim 5, wherein the GNSS process includes a Geofencing function, and wherein the cellular communications module is further configured to send a notification message to the GNSS module when location conditions associated with the Geofencing function are satisfied.

17. The communications device of claim 7, wherein the cellular communications module is configured to forward one or more of: a frequency offset correction message, a fine time assistance (FTA) message, and an assisted-GNSS (A-GNSS) message to the GNSS module via the communication channel interface.

18. A communications device, comprising:
   a cellular communications module;
   an integrated module including a cellular radio frequency integrated circuit (RFIC), a Global Navigation Satellite System (GNSS) receiver, and clock circuitry; and
   a communication channel interface that couples the cellular communications module and the GNSS receiver,
   wherein the clock circuitry is configured to:
      receive a clock signal and a temperature sensor signal indicative of temperature in proximity of a location within the communications device,
      utilize the temperature sensor signal as an index for a lookup table to retrieve a frequency correction,
      apply the frequency correction to the clock signal to generate a temperature compensated clock signal, and
      provide the temperature compensated clock signal to the cellular RFIC module and the GNSS module.

19. The communications device of claim 18, further comprising a clock oscillator module including:
   a crystal oscillator circuit configured to generate the clock signal; and
   a temperature sensor configured to generate the temperature sensor signal indicative of temperature in proximity of the crystal oscillator circuit.

* * * * *